UNITED STATES PATENT OFFICE.

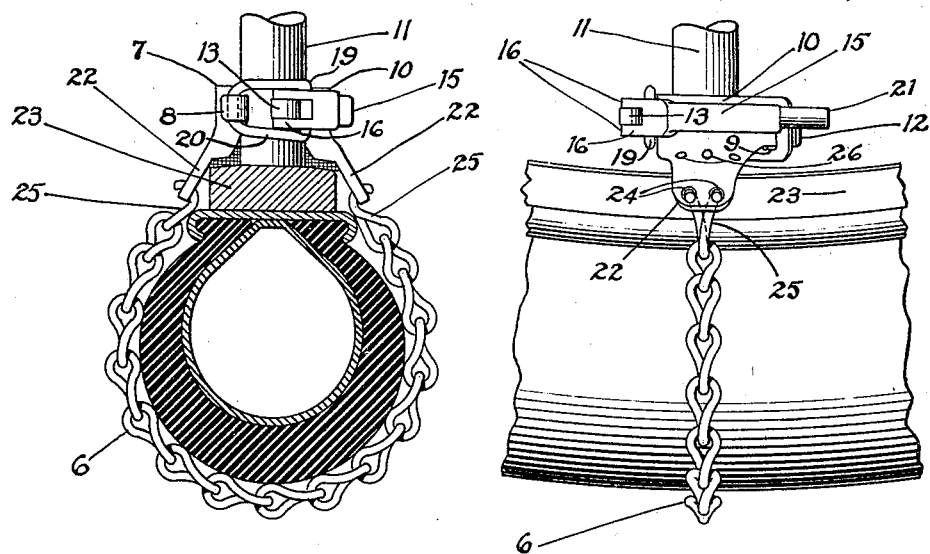
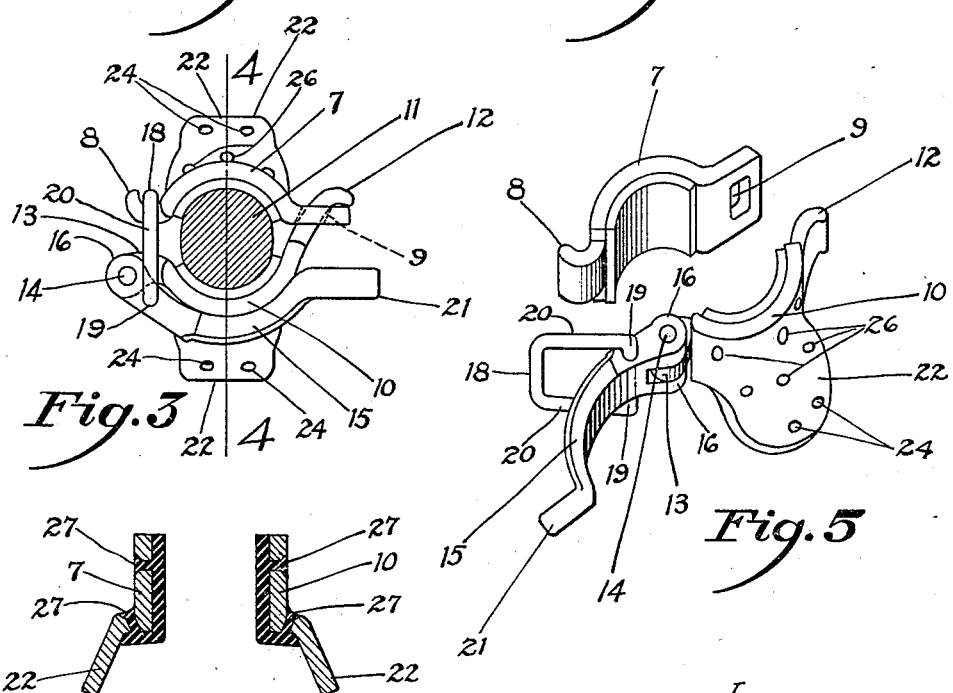

WILLIAM BERNDT, OF HAMEL, MINNESOTA, ASSIGNOR OF ONE-HALF TO HARRY J. DORWEILER, OF HAMEL, MINNESOTA.

ANTISKID DEVICE.

1,409,278.  Specification of Letters Patent.  Patented Mar. 14, 1922.

Application filed September 13, 1920. Serial No. 409,921.

*To all whom it may concern:*

Be it known that I, WILLIAM BERNDT, a citizen of the United States, resident of Hamel, county of Hennepin, and State of Minnesota, have invented certain new and useful Improvements in Antiskid Devices, of which the following is a specification.

This invention relates to improvements in anti-skid devices. More particularly it relates to such devices as are employed in connection with wheels of automobiles and trucks which are provided with rubber tires, solid or pneumatic. The function of this device, as of other devices of this general class, is to afford a better traction to the rubber-tired vehicle wheels when the roadbed is soft or wet. With more particularity, it relates to an improved means for clamping the tread element to a wheel spoke.

Threaded bolts, screws and wing-nuts are usually employed to secure together the parts of the common form of spoke clamp. Dirt, moisture and mud gather upon such threaded portions due to the very cause for the use of these devices, and subsequent removal of the clamp is always disagreeable and sometimes difficult. Furthermore, these threaded parts are, of course, closely adjacent the wheel periphery and therefore the threads are frequently injured and upset under working conditions by rocks, stones and other road obstructions. Subsequent removal is difficult, if it does not entail destruction of the threads. In this novel device, a lever is employed to secure the two parts of the clamp in locked position. Furthermore, the novel construction of this device is such that this lever, when moved to locked position, normally tends to remain in such position and, when it is moved toward releasing position, the novel lever mounting aids such releasing movement.

The object of this invention, therefore, is to provide an improved anti-skid device.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Fig. 1 is a partial section through a pneumatic-tired wheel having the device secured thereto;

Fig. 2 is a view in side elevation of the device in working position on a wheel;

Fig. 3 is a plan view of the device in position and with the spoke shown in section;

Fig. 4 is an enlarged section on the line 4—4 of Fig. 3, but with the spoke omitted;

Fig. 5 is a perspective of the two parts of the clamp in separated position and with the tire chain omitted.

In this preferred form of the invention, the tread-engaging element is flexible, being here shown as a chain 6 adapted to extend across the wheel tread and to be terminally secured to the clamp.

The clamp comprises two parts which are separable in order that the device may readily be mounted upon a wheel. These parts may be hereafter referred to, for purposes of description, as the lever part and the hook part. The hook part is substantially elongated and is arcuately curved at its middle portion 7. One end of this hook part is provided with a hook 8 while the other end is provided with a slot or aperture 9 to receive a tongue complementarily formed on the lever part of the clamp. The two parts of this separable clamp are adapted to be hingedly connected together by this tongue and slot connection.

The lever part is likewise substantially elongated and has an arcuately curved middle portion 10. These curved portions 7 and 10 are co-operably adapted to embrace a wheel spoke 11 when in position on a vehicle wheel. The lever part bears at one end a tongue 12 which is demountably receivable in the aperture 9. The other end of this part is provided with a shoulder 13 which bears a pivot pin 14 by which the lever 15 is carried by this lever part. The inner end of the lever 15 is preferably forked and each fork 16 is apertured to receive the pivot pin 14 by which the lever is pivotally carried. The lever is suitably curved in order that it may be pivotally moved from the open or releasing position shown in Figure 5 to its locking position shown in Figure 3 wherein the lever is indicated as positioned closely adjacent the outer surface of the arcuately curved middle portion 10.

This device is also provided with a member which is adapted to have engagement with both the lever 15 and the other clamp part so that the two clamp parts may be closely drawn together firmly to embrace a wheel spoke and thus to hold the tire chain in its position across the tread of the wheel. Further, this novel member is constructed and mounted so that when it is placed in its double-engaging position and the clamping lever is moved to clamping position as shown in Figure 3, the plane of the two engagements must pass through the pivotal axis of the clamping lever. In short, it passes dead-center or the so-called line of centers and the lever is thereby held in locked position.

Such double-engaging member is here shown as a substantially U-shaped link. The base 18 thereof is adapted to engage the hook 8 while the two ends 19 of the legs 20 thereof are inwardly turned and pivotally borne in suitable recesses in the clamping lever 15.

Comparison of the release position of the lever shown in Figure 5 and of the clamping position of the lever shown in Figure 3, will readily show that, when the base 18 is engaged with the hook 8, the plane which includes the engaged base and the pivotal axis of the link will be at the left in the release position; and that movement of the lever to clamping position causes this plane of hook and lever engagements to pass through the axis of the pivot pin 14 of the lever. Otherwise stated, the pivot pin 14 passes between the two legs 20 of the link to assume the position shown in Figure 3. Obviously, when the lever is in clamping position, the hook 8 exerts a pull on the link which in turn tends to pull the lever more closely against the adjacent outer face of the lever part of the clamp. Again, when the lever is manually moved by its terminal handle 21 toward release position and the pivot pin 14 has passed through the link legs, the pull exerted on the link tends to force the lever about its pivot away from the lever part.

Each clamp part is provided with a preferably integral depending ear 22 which is slightly offset from the part to provide space for the usual felly 23. Each ear is formed with a pair of apertures 24 to receive and demountably to retain the terminal links 25 of the tire chain 6.

Buffers may be carried on the interior faces of the middle portions 7 and 10 and, as here shown, they preferably extend over the lower face of the middle portions of the two parts and terminate adjacent the inner faces of the offset ears. These buffers are formed of a resilient material and protect the finish not only of the spokes but also of the adjacent felly surface. Rubber is the preferred material employed as it readily lends itself to the novel means of securing the buffers to the clamp parts. Apertures 26 are formed in the middle portions 7 and 10 and also in the ears 22. These apertures are outwardly enlarged in order that studs 27 may be received and held therein. These studs 27 are integral with the rubber buffers, being formed while the material is in the plastic state. The enlarged heads of the studs are thus countersunk, as shown in Fig. 4, and function securely to hold the buffers in place on the two clamp parts.

These buffers are adapted to contact with the spoke and not only protect the spoke finish but also to have an additional function. The resilience of the rubber under the compressive stress constantly exerts an outwardly thrusting force upon the two clamp parts when in working position. Such force is advantageous when the clamping lever is moved toward release position so that its pivotal axis has passed through the link legs, because this force then functions to impart an opening moment to the clamping lever. An easily opening clamping lever is thus provided for this novel anti-skid device.

Having thus described my invention, what I claim as new, and desire to secure by Letters-Patent, is:

1. An antiskid device for wheels, comprising a traction element, a two-part clamp connected thereto and engageable about a spoke of the wheel adjacent the felly thereof, means releasably connecting the parts of the clamp including a clamping lever foldable against one part of the clamp lengthwise of the felly so that its free end will lie substantially between adjacent spokes and necessitate an opening movement laterally of the wheel.

2. An antiskid device for wheels, comprising a traction element, a two-part spoke clamp connected thereto, each part having an arcuate seat for engaging about a spoke of the wheel and an outwardly depending ear, a cushioning liner for each part having integral means of securement extending through apertures in said part, and means for attaching the clamp to a spoke.

3. An antiskid device comprising a traction element, and a two-part clamp to which said element is attached, one part having a hook at one end and an aperture at the opposite end, and the other part having a hook at one end engageable in the aperture and a tightening lever pivoted on the opposite end for folding against its part with its free end overlying the hook and aperture connection and extending therebeyond substantially in the plane of the wheel, and a link pivoted to the lever for detachably engaging over the first hook end.

In witness whereof, I have hereunto set my hand this 4th day of September, 1920.

WILLIAM BERNDT.